(12) United States Patent
Milojicic et al.

(10) Patent No.: US 6,756,704 B2
(45) Date of Patent: Jun. 29, 2004

(54) LOCKING MECHANISM FOR LOCKING ELECTRONIC DEVICES

(75) Inventors: Dejan S. Milojicic, Palo Alto, CA (US); Alan Messer, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 179 days.

(21) Appl. No.: 10/152,432

(22) Filed: May 21, 2002

(65) Prior Publication Data

US 2003/0218383 A1 Nov. 27, 2003

(51) Int. Cl.[7] .............................................. G08B 13/14
(52) U.S. Cl. ...................................... 307/149; 340/572.9
(58) Field of Search .......................... 340/825.72, 531, 340/572.9, 825.5, 5.7, 5.31, 571, 5, 64, 572.1, 5.73, 5.64; 70/278.1, 280, 277; 307/149

(56) References Cited

U.S. PATENT DOCUMENTS 4,779,090 A * 10/1988 Micznik et al. ............ 340/5.26
5,692,400 A    12/1997 Bliven et al.
6,032,858 A *  3/2000 Yazumi et al. ............... 235/379
6,170,304 B1   1/2001 Ohta
6,310,411 B1  10/2001 Viallet
6,359,547 B1 *  3/2002 Denison et al. ............. 340/5.73
6,420,971 B1 *  7/2002 Leck et al. .................. 340/542
6,529,382 B2 *  3/2003 Terao ........................... 361/726
2002/0158761 A1 * 10/2002 Runyon et al. ........... 340/572.1
2003/0076230 A1 *  4/2003 Runyon et al. ........... 340/572.1

* cited by examiner

Primary Examiner—Shawn Riley (57) ABSTRACT

A locking system for securing an electronic device includes a locking signal transmitter anchored at a physical location away from the electronic device to transmit a locking signal. A receiver resides in the electronic device to receive the locking signal. A controller is coupled to the receiver and circuitry of the electronic device to virtually lock the electronic device at its location when the receiver keeps receiving the locking signal, and to disable the electronic device from being accessed after the receiver has stopped receiving the locking signal for a predetermined time period. The locking does not have any effect on functioning of the electronic device as long as the locking signal is received. When the device is unlocked, failure of the device lock to receive the locking signal also does not have any effect on the electronic device.

26 Claims, 7 Drawing Sheets

LOCKING MECHANISM FOR LOCKING ELECTRONIC DEVICES

BACKGROUND OF THE INVENTION

1. Field of the Invention

The present invention pertains to locking electronic devices. More particularly, this invention relates to virtually locking an electronic device (e.g., a portable computer) such that the locked device is still not usable when the locking mechanism is compromised.

2. Description of the Related Art

As is known, before computers became prevalent, sensitive information was typically stored in a filing cabinet which could be locked when the custodian was absent. When computers were first invented, they were large machines housed in separate rooms and were accessible only to those with specialized knowledge and access to those computer rooms, making security more or less inherent in the cumbersome nature of the large computer systems.

As the size of computers shrinks, the computers become more and more portable. This allows a computer to be easily carried around, thus allowing more people to access the computer. Moreover, as the portable computers have entered homes and business offices or cubicles, and as they have become more and more user-friendly, they can be accessed by many people with knowledge of standard software. These factors typically make it impossible to completely control access to a computer.

However, as the use of personal computers and other electronic devices proliferates, many of today's personal or business computers also store sensitive information. This makes it even more necessary and important to control access of a computer system.

Prior art techniques have been proposed to provide computer security. A typical prior art technique uses a physical lock that may be inserted into a standardized locking apertures or slots in the cover of a computer or other electronic device to secure the cover to the chassis. This locking mechanism is to prevent unauthorized access to the internal components of the computer or electronic device. In addition, the locking mechanism can also be physically attached to a physical location, thus preventing the entire computer from being removed from the location. The locking mechanism can also be electrically controlled to lock or unlock the target device.

Another prior art technique is to insert an anchored lock (e.g., Kingston Lock) into a lock receptacle of a computer or electronic device to lock the target computer or electronic device at the physical location. The lock is anchored by a cable or tether at the physical location. The lock may also be used to lock a docking station used to dock a portable computer. In this way, both the computer and the docking station are locked.

These prior art solutions, however, bear disadvantages. For example, the anchoring cable or tether can be cut loose so that the locked device can still be taken away. As a further example, the lock itself may be destroyed or tampered to free the locked device.

Another disadvantage is that the locks only function passively. They do not generate any alarm (or security breach notification) when the locks are being destroyed and their locked devices are being taken away.

SUMMARY OF THE INVENTION

One feature of the present invention is to effectively lock an electronic device.

Another feature of the present invention is to effectively lock an electronic device such that the locked device is still not usable even when the locking mechanism is compromised.

A further feature of the present invention is to effectively lock an electronic device such that alarm is sent when the locking mechanism is compromised.

In accordance with one embodiment of the present invention, a locking system for securing an electronic device includes a locking signal transmitter anchored at a physical location away from the electronic device to transmit a locking signal. A receiver resides in the electronic device to receive the locking signal. A controller is coupled to the receiver and circuitry of the electronic device to virtually lock the electronic device when the receiver keeps receiving the locking signal, and to disable the electronic device from being accessed after the receiver has stopped receiving the locking signal for a predetermined time period.

Alternatively, the locking signal transmitter can be fastened to a movable object and the electronic device can also be mobile when locked.

As an another alternative, the controller can also cause an alarm signal to be sent when the receiver has stopped receiving the locking signal for a predetermined time period. Alternatively, the alarm signal may also be sent from the locking signal transmitter. In this case, the controller causes a locking confirmation signal to be sent back to the locking signal transmitter when the receiver receives the locking signal. The locking signal transmitter generates the alarm signal when it does not receive the locking confirmation signal for a predetermined time period.

Moreover, the locking signal transmitter may also unlock the electronic device by generating an unlocking signal. In this case, the controller unlocks the electronic device when the receiver receives the unlocking signal. Alternatively, the locking and unlocking initiation is done by an activation signal applied to the controller.

DETAILED DESCRIPTION OF THE INVENTION

Figure 1:
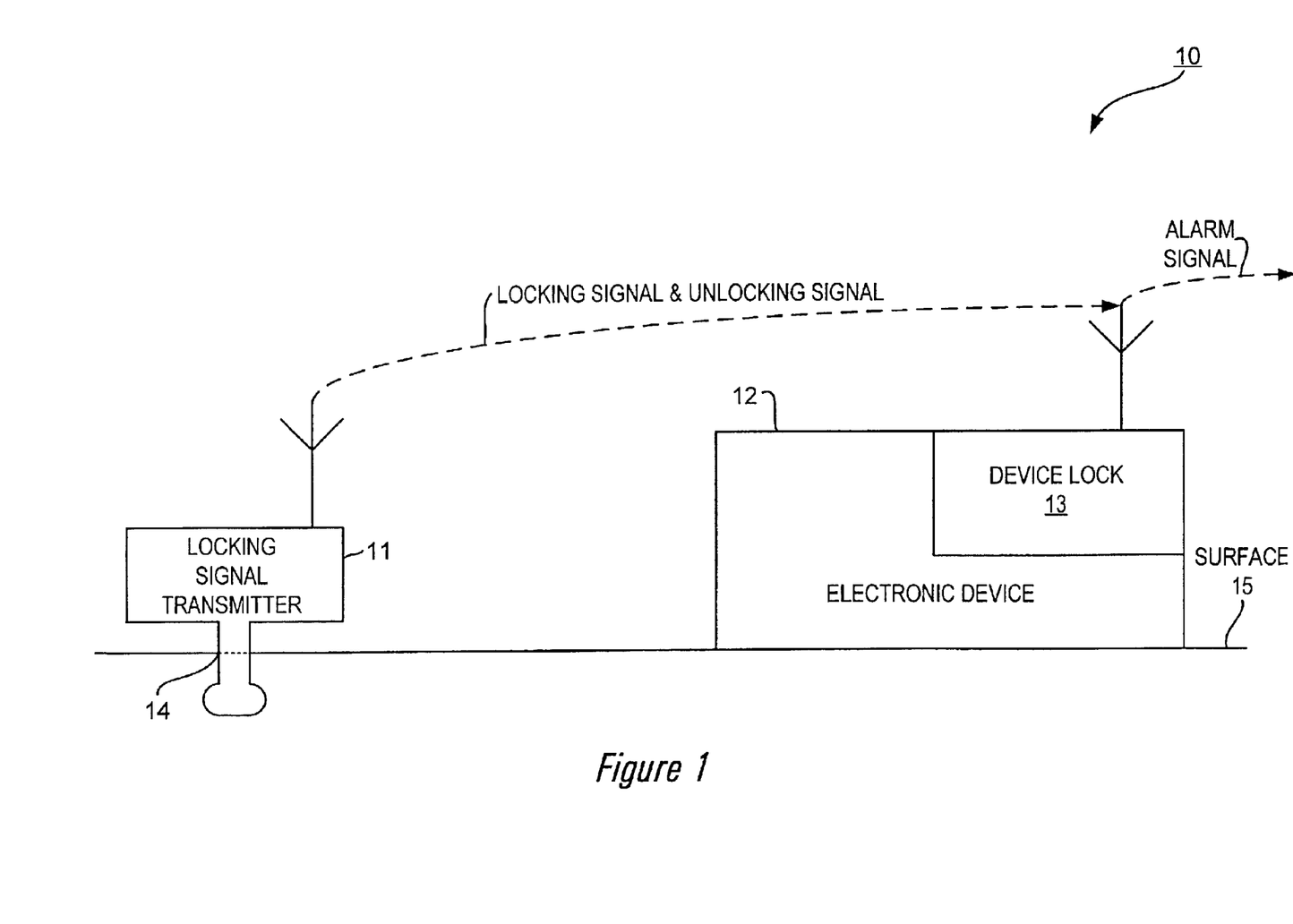
FIG. 1 shows a locking system for locking an electronic device in accordance with one embodiment of the present invention, wherein the locking system includes a locking signal transmitter and a device lock away from the transmitter and within the electronic device.

FIG. 1 shows a locking system 10 for locking an electronic device 12. The locking system 10 implements one embodiment of the present invention.

As can be seen from FIG. 1, the locking system 10 includes a locking signal transmitter 11 anchored at a physical location 14, and a device lock 13 within (or attached to) the electronic device 12. The electronic device 12 is placed on a surface 15, away from the anchored transmitter 11. The transmitter 11, when activated, sends a wireless locking signal that, when received by the device lock 13, causes the device lock 13 to virtually lock the electronic device 12. The device lock 13 receives the wireless locking signal when within the transmission range of the transmitter 11. The device lock 13 virtually locks the electronic device 12 when the device lock 13 keeps receiving the locking signal. The locking signal can only be recognized by the device lock 13. This means that the locking signal will not lock other electronic devices equipped with a locking system in accordance with the present invention.

This locking is a virtual locking because there is no physical lock mechanism involved to lock the electronic device at its location. In this case, the device lock 13 only locks the electronic device 12 at its location (i.e., unmovable). This locking, however, does not have any effect on the functioning of the electronic device 12.

When the device lock 13 fails to receive the locking signal for a predetermined time period (e.g., when the electronic device 12 and the accompanying device lock 13 are removed from its locked location such that the device lock 13 is out of the transmission range of the transmitter 11, or the transmitter 11 is destroyed by a thief), the device lock 13 disables the electronic device 12 from being accessed. This prevents the electronic device 12 from being accessed (or data stored in the electronic device 12 from being accessed). When the electronic device 12 and the accompanying device lock 13 are moved back within the transmission range of the transmitter 11, the device lock 13 may again enable the electronic device 12.

There are a number of ways that the device lock 13 can disable the electronic device 12. For example, the device lock 13 can electronically disable the electronic device 12 (e.g., screen/keyboard lock, erasing hard drive, blocking access to the memory of the device). As a further example, the disabling can be done at the power supply of the electronic device 12. Moreover, the disabling can be a mechanical one (e.g., preventing the electronic device 12 from being opened).

Thus, when the electronic device 12 is locked, removing it away from its locked location (thus causing the device lock 13 with the electronic device 12 to be unable to receive the locking signal) will disable the device 12 (i.e., cause the device unaccessible). However, if the electronic device 12 is not locked, removing it away from its location will not cause the device 12 to be disabled.

In addition, the device lock 13 may also cause an alarm signal to be sent when the device lock 13 has stopped receiving the locking signal for a predetermined time period. The alarm signal can be a simple alarm sound signal, or a signal to site security office that includes information of which electronic device at what location is being stolen or moved without authorization. Moreover, the locking signal transmitter 11 may also unlock the electronic device 12 by generating an unlocking signal to the device lock 13. When the device 12 is unlocked, removing it away from its location (or failure of the device lock 13 to receive the locking signal) no longer causes the device 12 to be disabled. Alternatively, the locking and unlocking initiation is done by an activation signal applied to the device lock 13. The locking system 10 will be described in more detail below, also in conjunction with FIGS. 1–3.

Referring to FIG. 1, the electronic device 12 can be any kind of electrical or electronic device. For example, the electronic device 12 can be a personal digital assistant (PDA), a cellular phone, a pager, a computer, a printer, a scanner, a fax machine, a copier, a MP-3 player, a digital camera, a DVD/CD-W machine, a storage device, or another other electrical or electronic device. When the electronic device 12 is a computer, the computer can be a notebook computer, a desk-top personal computer, or a work station computer, a server computer, or another other type of computer.

The device lock 13 can be located within the electronic device 12, or attached to the electronic device 12. For example, when the electronic device 12 is a notebook computer, some modules (e.g., the receiver and the transmitter) of the device lock 13 can be a card (e.g., a PCMCIA type of card) that can be inserted into the notebook computer.

As described above, the locking signal transmitter 11 is anchored at the physical location 14. The anchoring can be done in many known ways. For example, the anchoring can be done by a fastening the transmitter 11 to the surface 15 with a nail, a screw, adhesive, or any other known fastening means. As another example, the transmitter 11 can be integrated into the object (not shown) that contains the surface 15.

The locking signal transmitter 11 transmits the locking signal. The locking signal is a wireless signal. In one embodiment, the locking signal is a short range radio frequency (e.g., Bluetooth) wireless signal. In this case, the transmitter is a short range radio frequency wireless signal transmitter. In another embodiment, the locking signal can be an Infrared signal, a laser signal, a microwave frequency wireless signal. In this case, the transmitter 11 can be one of an Infrared signal transmitter, a laser signal transmitter, or a microwave frequency signal transmitter.

The locking signal transmitter 11 has a predetermined transmission range within which the locking signal can be received. In one embodiment, the transmission range is approximately two feet to six feet. In another embodiment, the transmission range can be shorter than two feet or longer than six feet.

In addition, the locking signal transmitter 11 may have dual transmission ranges, one for transmitting the locking signal and the other for transmitting other signals.

The device lock 13 locks the electronic device 12 when it receives the locking signal. As described above, there are a number of implementations to lock the electronic device 12, which will not be described in more detail below. When the device lock 13 has stopped receiving the locking signal from the transmitter 11, the device lock 13 disables the electronic device 12. As stated above, there are a number of options to disable the electronic device 12 and they will not be described in more detail below.

As described above, the locking signal can only be recognized by the device lock 13. This means that a one-to-one relationship exists between any locking signal transmitter and its corresponding device lock. This is to prevent locking of another electronic device with its own device lock to be locked when within the transmission range of the transmitter 11. This one-to-one relationship can be achieved by assigning a unique frequency (or amplitude or phase) to each locking signal. This can also be done by assigning a unique ID to each locking signal.

As described above, when the device lock 13 has failed to receive the locking signal for a predetermined time period, the device lock 13 disables the electronic device 12. This time period requirement is to ensure that the device lock 13 is indeed out of the transmission range of the transmitter 11, and the interruption is not caused by brief blocking (i.e., a false alarm). For example, the interruption in the receipt of the locking signal may be caused by an inadvertent brief blocking by a human being in the transmission path between the transmitter 11 and the device lock 13. As a further example, the interruption may be caused by moving the electronic device 12 away from its location very briefly to, for example, to clean the surface 15.

In one embodiment, the predetermined time period range from approximately ten to sixty seconds. Alternatively, the predetermined time period can be shorter than ten seconds or longer than sixty seconds.

Figure 2:
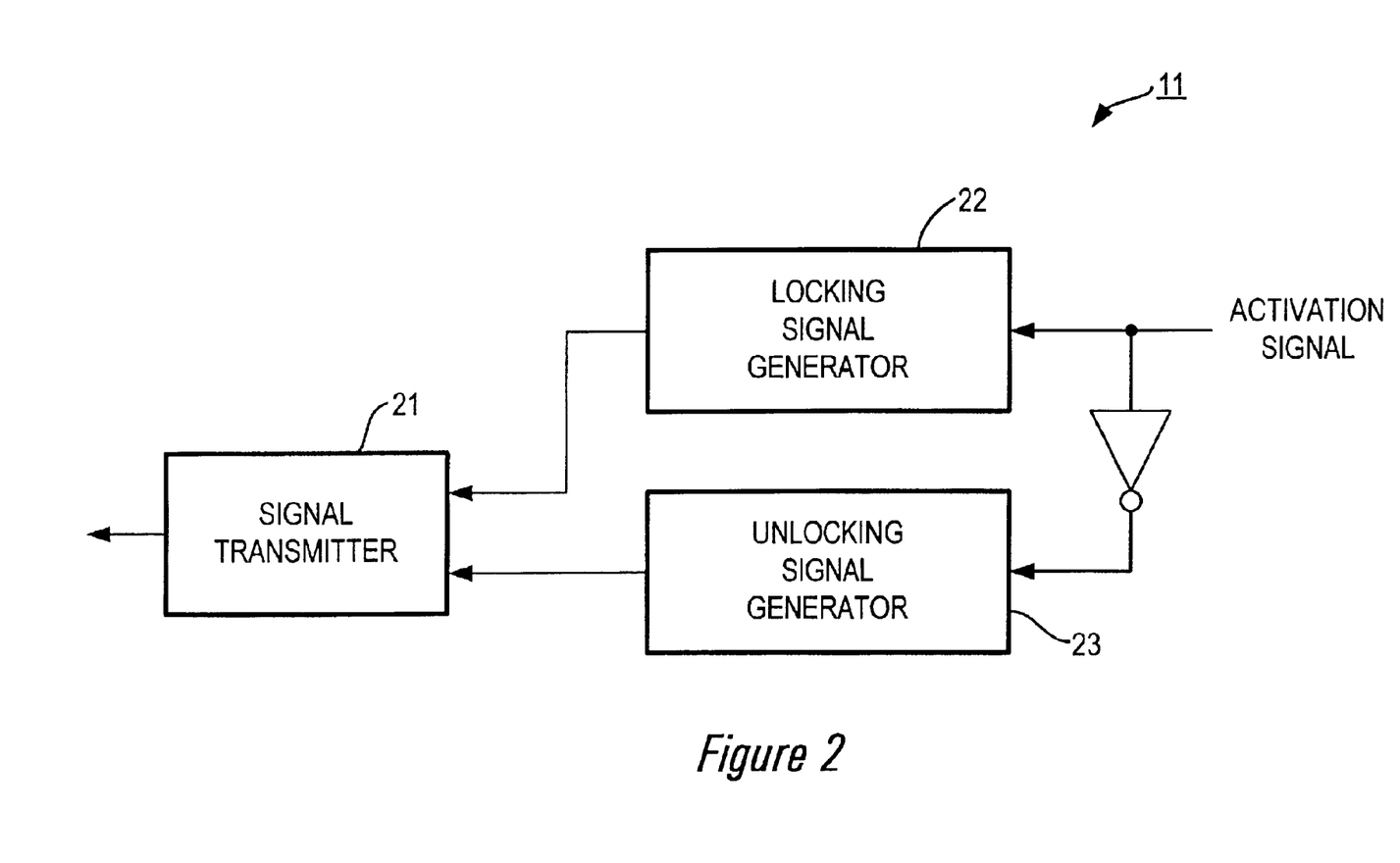
FIG. 2 shows the locking signal transmitter of FIG. 1.
Figure 3:
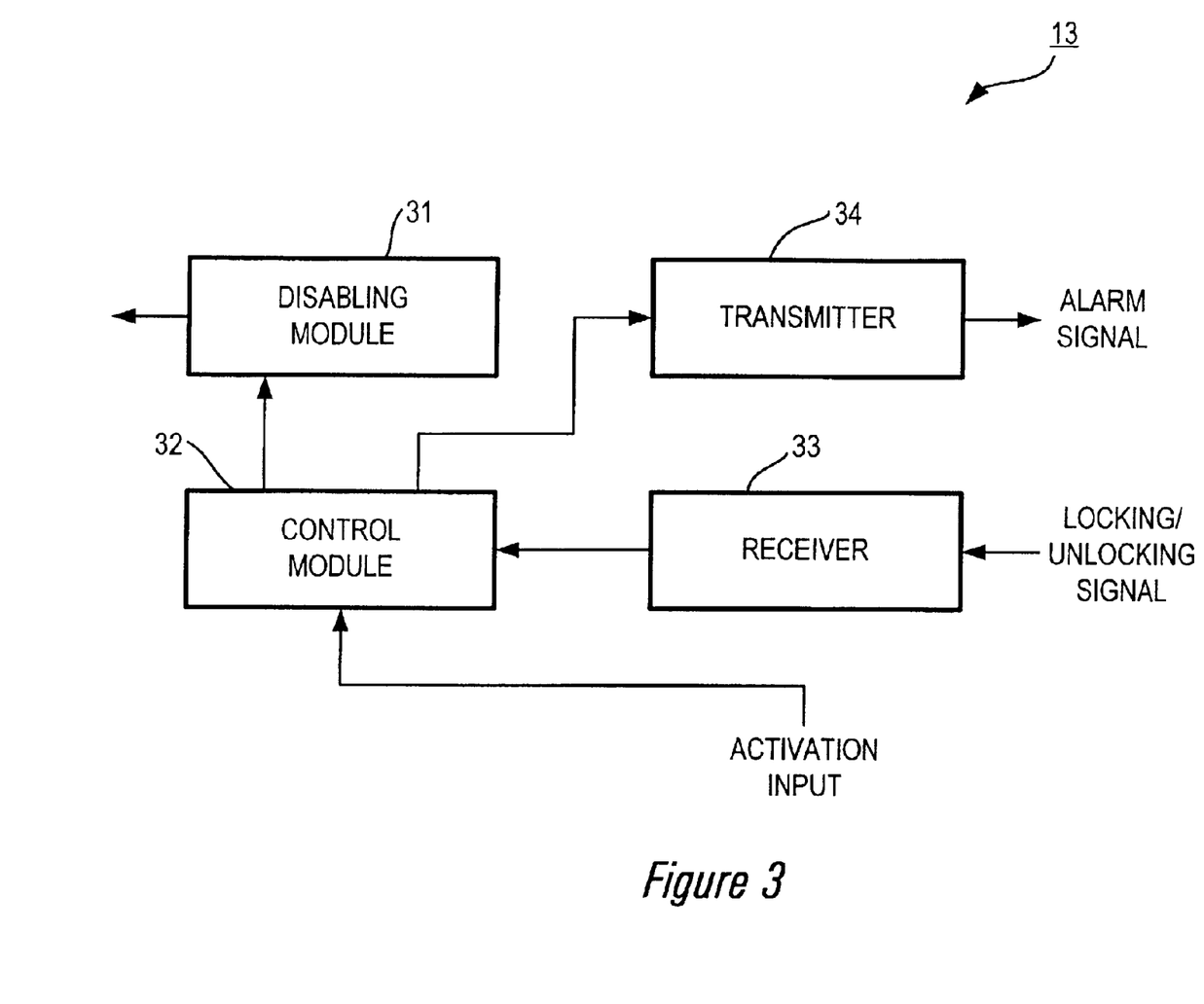
FIG. 3 illustrates the structure of the device lock of FIG. 1.

In addition, the device lock 13 may send the alarm signal or notification when it has stopped receiving the locking signal. In this case, the device lock 13 also contains a transmitter. The alarm signal can be a short range radio frequency (e.g., Bluetooth) wireless signal, an Infrared signal, a laser signal, a microwave frequency wireless signal. The alarm signal may be just a alarm sound signal or a signal that contains information that can notify security as to which electronic device at what location is being taken without authorization. FIG. 2 shows in more detail the structure of the locking signal transmitter 11, which will be described in more detail below. FIG. 3 shows the structure of the device lock 13, which will be described in more detail below.

As can be seen from FIG. 2, the locking signal transmitter 11 includes a signal transmitter 21, a locking signal generator 22, and an unlocking signal generator 23. Alternatively, the transmitter 11 does not contain the unlocking signal generator 23. In this case, the locking signal transmitter 11 constantly generates and sends the locking signal to the device lock 13 (FIG. 1). It is the device lock 13 of FIG. 1 that controls when the locking system 10 is activated to be locked or not. The transmitter 11 only passively sends out the locking signal.

The signal transmitter 21 is used to transmit the locking signal. In addition, the signal transmitter 21 transmits the unlocking signal (when the locking signal transmitter 11 includes the unlocking signal transmitter 23). The signal transmitter 21 receives the locking signal from the locking signal generator 22, and the unlocking signal from the unlocking signal generator 23.

The locking signal generator 22 generates the locking signal, and the unlocking signal generator generates the unlocking signal. The locking signal generator 22 can be controlled or activated by user inputs to generate the locking signal.

The unlocking signal generator 23 can also be controlled or activated by external user inputs. In this case, the activation signal is the inverted signal of the activation signal to the locking signal generator 22. This means that when an activation signal is applied to the locking signal generator 22, the locking signal generator 22 is activated to generate the locking signal and the unlocking signal generator 23 is deactivated. When the locking signal generator 22 is deactivated by a user input, the locking signal generator 22 is deactivated while the inverted signal of that input activates the unlocking signal generator 23 to generate the unlocking signal. All of the modules 21–23 can be implemented using known technology.

As can be seen from FIG. 3, the device lock 13 includes a disabling module 31, a control module 32, a receiver 33, and a transmitter 34. Alternatively, the device lock 13 does not contain the transmitter 34. In this case, the device lock 13 does not send out the alarm signal.

The disabling module 31 and the control module 32 can be collectively referred to as a controller. The disabling module 31 is connected to various circuits of the electronic device 12 (FIG. 1). The control module 32 is connected to the disabling module 31. The disabling module 31 disables the electronic device 12. As described above, there are a number of implementations to disable the electronic device 12. For example, the device lock 13 can electronically disable the electronic device 12 (e.g., screen/keyboard lock). As a further example, the disabling can be done at the power supply of the electronic device 12. Moreover, the disabling can be a mechanical one (e.g., preventing the electronic device 12 from being opened).

The disabling module 31 is controlled by the control module 32. The control module 32 causes the disabling module 31 to do nothing (i.e., not affecting in any way the functioning of the electronic device 12) when the receiver 33 receives the locking signal, and causes the disabling module 31 to disable the electronic device 12 when the receiver 33 has stopped receiving the locking signal for a predetermined time period. The control module 32 can be activated by an external activation signal (i.e., user input), or when the receiver 33 receives the locking (or unlocking) signal. In the first case, another external deactivation signal is required to deactivate the control module 32 (and thus the device lock 13). In the later case, the control module 32 is deactivated when the receiver 33 receives the unlocking signal from the locking signal transmitter 11 (FIG. 1).

In addition, when the device lock 13 also generates and sends the alarm signal, the transmitter 34 is included for the device lock 13. In this case, the control module 32 causes the transmitter 34 to send the alarm signal when the receiver 33 has stopped receiving the locking signal for the predetermined time period. Each of the modules 31–34 can be implemented using known means and therefore their structures will not be described in more detail below.

Figure 4:
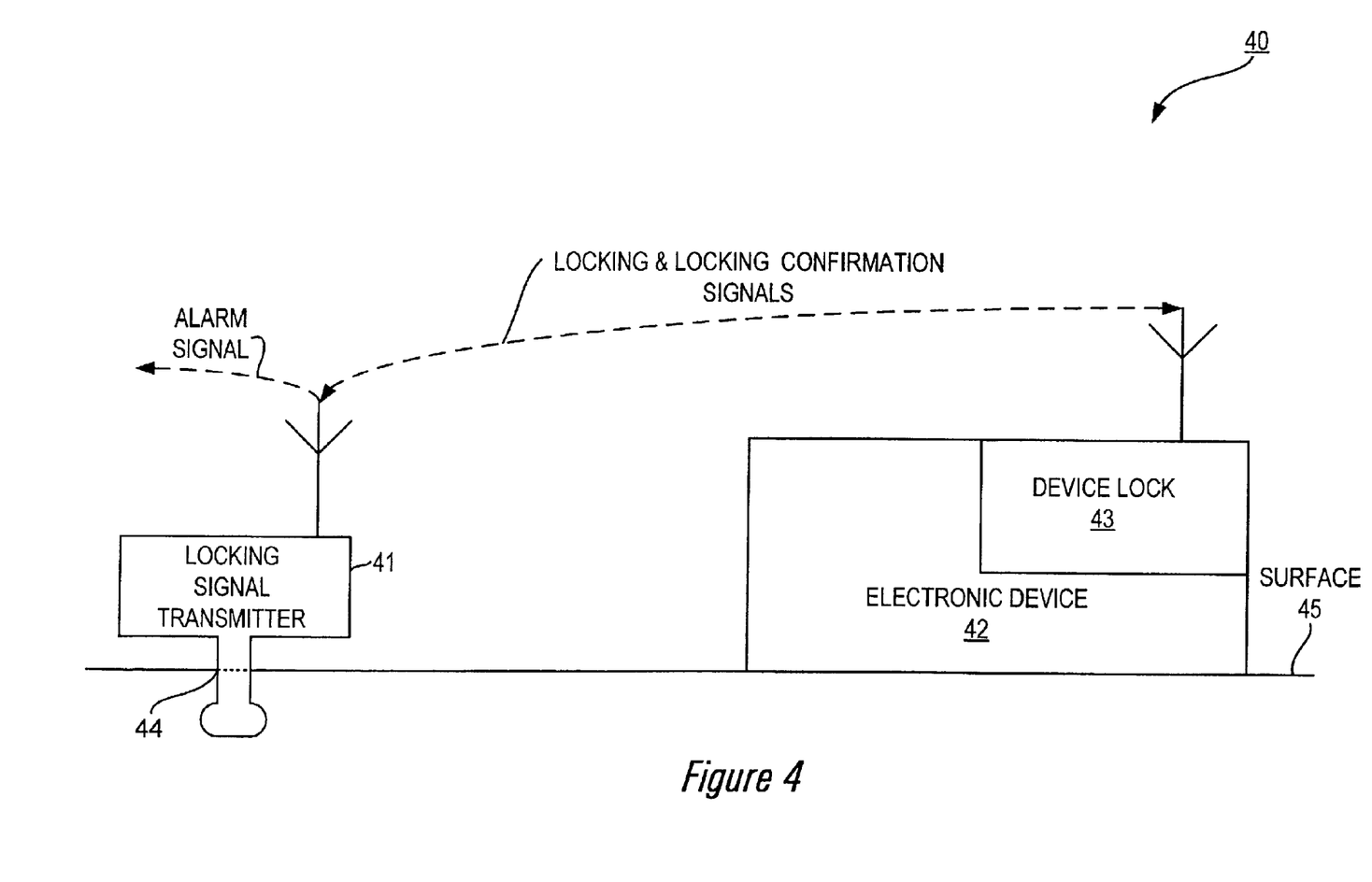
FIG. 4 shows a locking system for locking an electronic device in accordance with another embodiment of the present invention, wherein the device lock sends a locking confirmation signal back to the locking signal transmitter whenever it receives the locking signal and the transmitter also sends out an alarm signal whenever it fails to receive the locking confirmation signal.

FIG. 4 shows a locking system 40 that implements another embodiment of the present invention. As can be seen from FIG. 4, the locking system 40 includes a locking signal transmitter 41 and a device lock 43. Like the locking signal transmitter 11 of FIG. 1, the locking signal transmitter 41 of FIG. 4 is also anchored at a physical location 44 and transmits the locking signal to the device lock 43. Like the device lock 13 of FIG. 1, the device lock 43 of FIG. 4 is also within (or attached to) the electronic device 42, and locks the electronic device 42 when receiving the locking signal from the transmitter 41. The main difference between the locking system 40 of FIG. 4 and the locking system 10 of FIG. 1 is that the device lock 43, when receiving the locking signal from the transmitter 41, sends back a locking confirmation signal to the transmitter 41. In addition, the transmitter 41 (not the device lock 43) generates and sends an alarm signal if the transmitter 41 does not receive the locking confirmation signal from the device lock 43 for a predetermined time period.

Each of the locking signal, the locking confirmation signal, and the alarm signal is a wireless signal. In one embodiment, each of the signals is a short range radio frequency (e.g., Bluetooth) wireless signal. In another embodiment, each of the signals can be an Infrared signal, a laser signal, a microwave frequency wireless signal.

Figure 5:
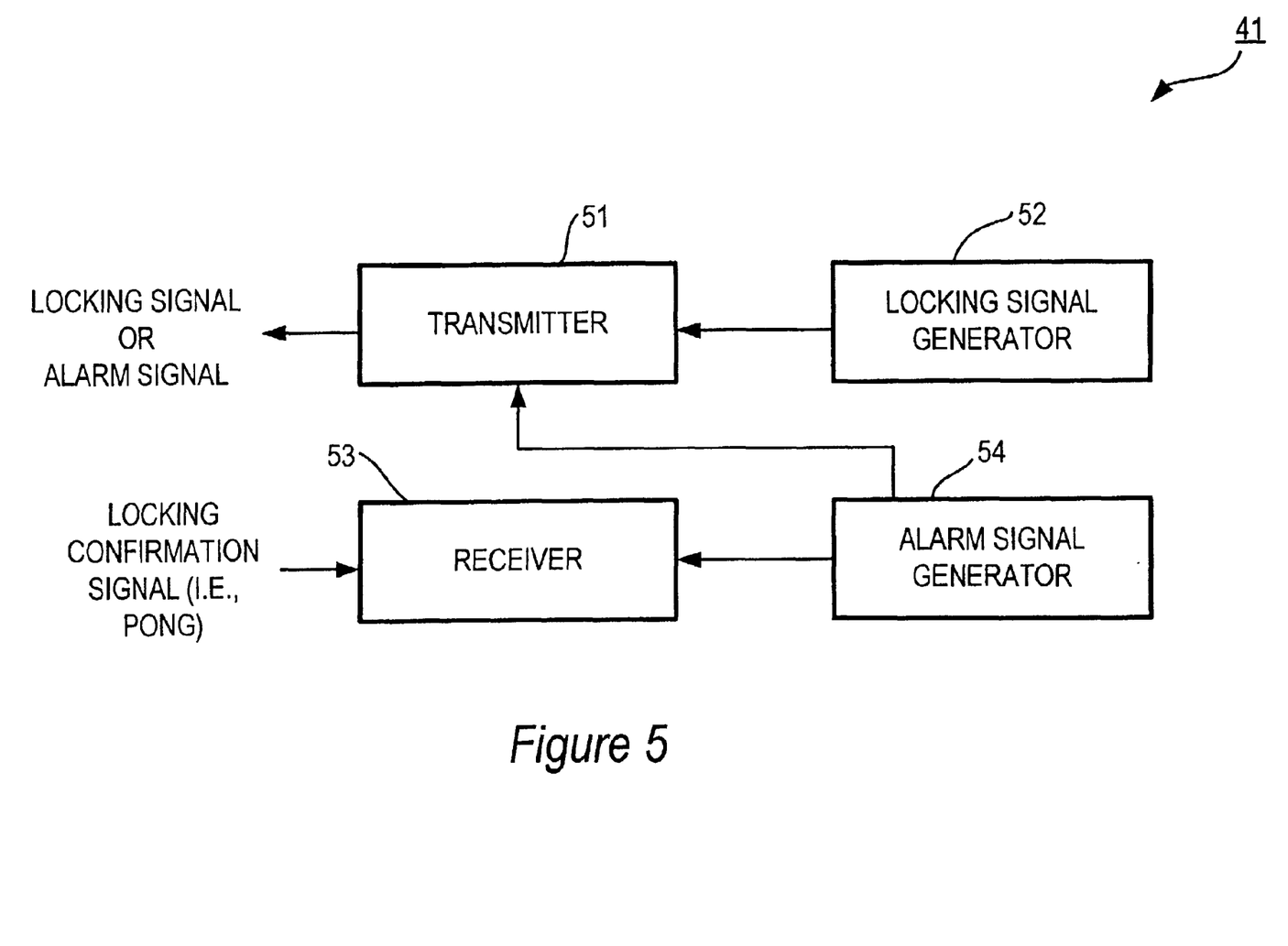
FIG. 5 shows the structure of the transmitter of FIG. 4.
Figure 6:
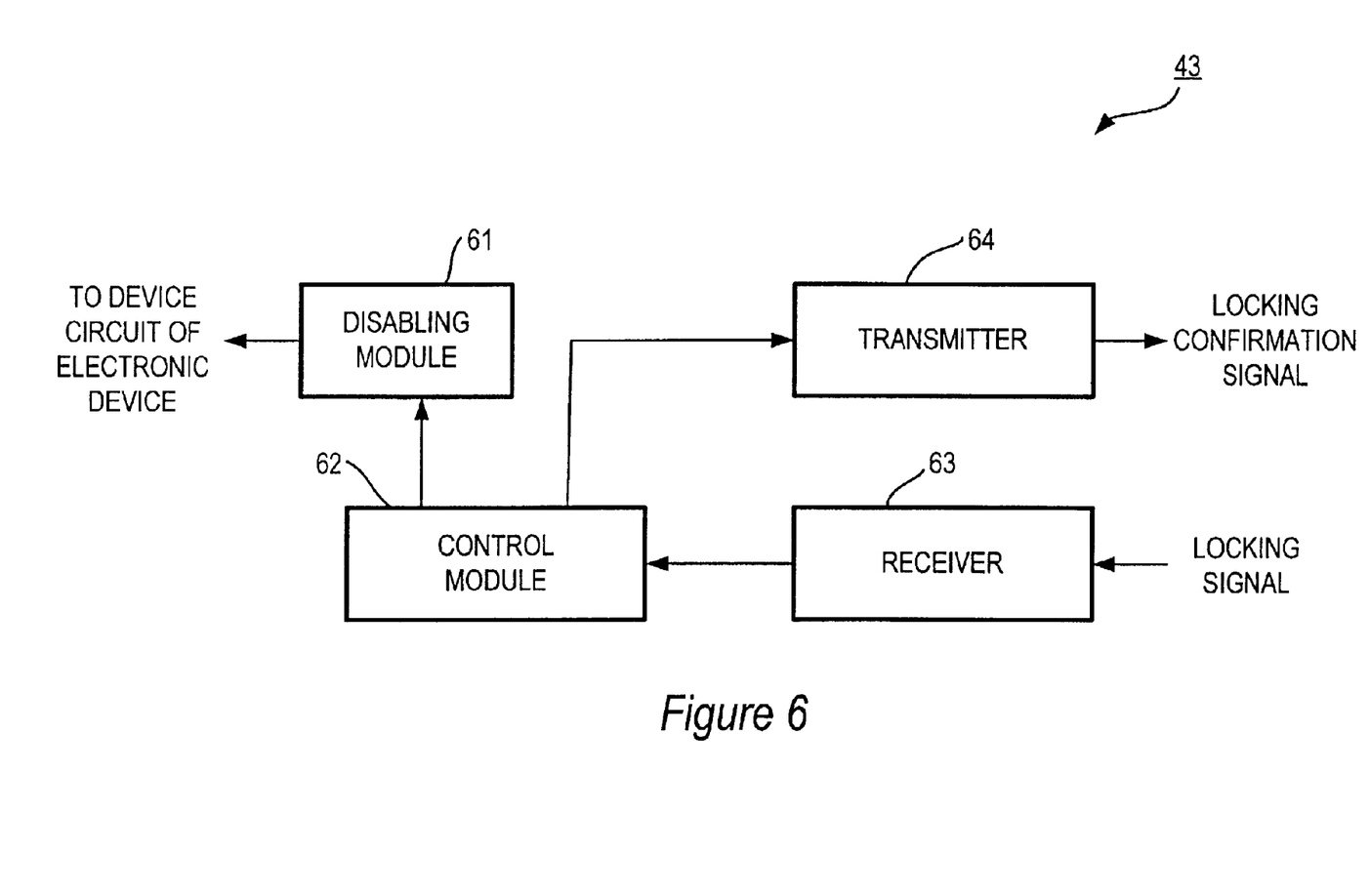
FIG. 6 shows the structure of the device lock of FIG. 4.

As can be seen from FIG. 4, the locking signal transmitter 41 may have two transmission ranges, one for transmitting the locking signal and the other for transmitting the alarm signal. The device lock 43 also has a transmission range for transmitting the locking confirmation signal. This transmission range can be equal to the transmission range of the locking signal transmitter 41 in transmitting the locking signal. FIG. 5 shows the structure of the locking signal transmitter 41, which will be described in more detail below. FIG. 6 shows the structure of the device lock 43, which will be described in more detail below.

Referring to FIG. 5, the locking signal transmitter 41 includes a transmitter 51, a locking signal generator 52, a receiver 53, and an alarm signal generator 54. The receiver 53 is connected to the alarm signal generator 54 and the transmitter 51 is connected to the locking signal generator 52 and the alarm signal generator 54.

The transmitter 51 is used to transmit the locking signal or the alarm signal. The locking signal generator 52, when activated, generates the locking signal, which is then transmitted by the transmitter 51. The receiver 53 is used to receive the locking confirmation signal from the device lock 43 of FIG. 4.

When the receiver 53 receives the locking confirmation signal, the alarm signal generator 54 is not activated. When the receiver 53 stops receiving the locking confirmation signal for a predetermined time period, the alarm signal generator 54 is activated to generate the alarm signal which is then sent by the transmitter 51. Each of the modules 51–54 can be implemented by known technology and their structure will not be described in more detail below.

Referring to FIG. 6, the device lock 43 includes a disabling module 61, a control module 62, a receiver 63, and a transmitter 64. The disabling module 61 and the control module 62 form the controller of the device lock 43. Each of the modules 61–64 can be implemented using known technology and therefore their structures will not be described in more detail below.

As can be seen from FIGS. 3 and 6, the modules 61–64 of the device lock 43 perform substantially the same functions as the modules 31–34 of the device lock 13 of FIG. 3, except that the transmitter 64 transmits a locking confirmation signal (instead of the alarm signal) to the locking signal transmitter 41 (FIG. 4). In this case, the control module 62 causes the transmitter 64 to transmit the locking confirmation signal whenever the receiver 63 keeps receiving the locking signal.

Figure 7:
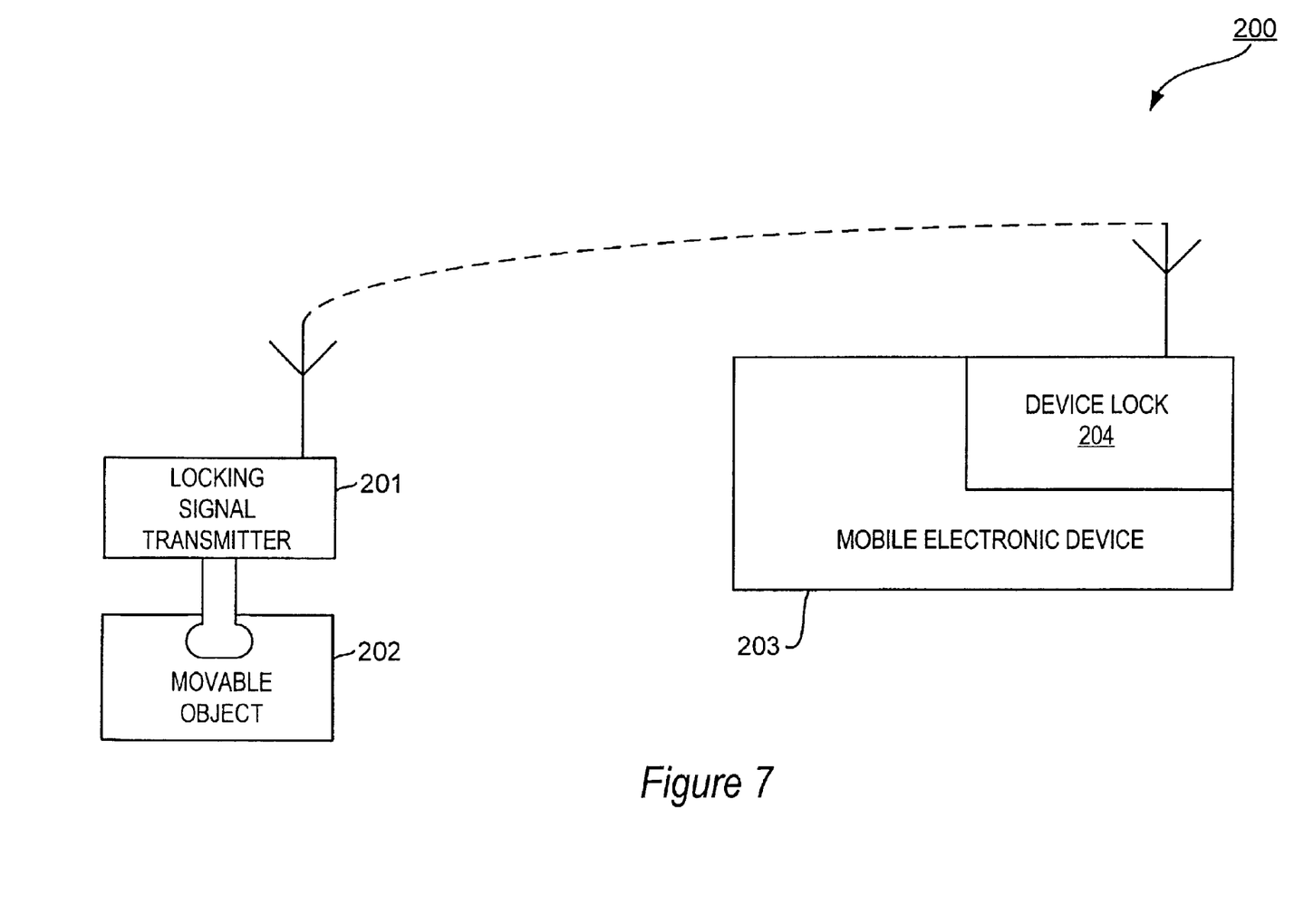
FIG. 7 shows a locking system for locking a mobile electronic device in accordance with yet another embodiment of the present invention, wherein the locking signal transmitter is fastened to a movable object.

FIG. 7 shows a locking system 200 for locking a mobile electronic device 203 in accordance with another embodiment of the present invention. As can be seen from FIGS. 1, 4, and 7, the locking system 200 of FIG. 7 is similar to the locking system 10 of FIG. 1, or the locking system 40 of FIG. 4. This means that the locking signal transmitter 201 of FIG. 7 functions the same way as the locking signal transmitter 11 of FIG. 1 (or the locking signal transmitter 41 of FIG. 4) and the device lock 204 of FIG. 7 functions substantially the same way as the device lock 13 of FIG. 1 (or the device lock 43 of FIG. 4). The main difference is that the locking signal transmitter 201 of the locking system 200 is anchored to a movable object 202. This means that the transmitter 201 can be moved as well. The locking system 200 works as long as the electronic device 203 (mobile or not) is kept within the transmission range of the transmitter 201, no matter whether each of the two modules 201 and 203 is moving with respect to the other or not.

The movable object 202 can be a wristband that can be worn by a human being. The movable object 202 can also be key-chain, a waist-belt, a pin, or a piece of jewelry. In addition, the electronic device 203 can be a PDA, a cellular phone, a pager, a notebook computer, a MP-3 player, or a digital camera.

Thus, the locking system 200 works, for example, when the locking signal transmitter 201 is attached to a human being via the movable object 202 and the mobile electronic device 203 (e.g., a cell phone, a PDA, a pager, a digital camera, or a notebook computer) is being placed by the same human being at a location that is within the transmission range of the transmitter 201. For example, when the human being is playing a football and puts his cell phone (i.e., the electronic device) at the side of the field, he can lock the cell phone with the locking system 200. In this case, the player carries the transmitter with him and the cell phone is locked as long as it is at the side of the field. If someone takes the phone away, the phone is disabled and still cannot be used. In this case, the transmission range can be a couple of hundred yards. In addition, an alarm will be sent to the player to notify him of the unauthorized removal.

In addition, each of the locking system 10 (FIG. 1), the locking system 40 (FIG. 4), and locking system 200 (FIG. 7) can be used to virtually lock multiple electronic devices. In this case, there is only one locking signal transmitter and multiple device locks, each in one of the electronic devices to be locked. The locking signal must be recognized by all the device locks for the multiple electronic devices, in this case.

In the foregoing specification, the invention has been described with reference to specific embodiments thereof. The specification and drawings should, however, be regarded in an illustrative rather than a restrictive sense.

What is claimed is:

1. A locking system for securing an electronic device, comprising:
   a locking signal transmitter anchored at a physical location away from the electronic device to transmit a locking signal;
   a receiver in the electronic device to receive the locking signal; and
   a controller coupled to the receiver and circuitry of the electronic device to lock the electronic device when the receiver keeps receiving the locking signal and to disable the electronic device from being accessed after the receiver has stopped receiving the locking signal for a predetermined time period.

2. The locking system of claim 1, wherein the controller is activated by an activation signal, and deactivated when receiving a deactivation signal.

3. The locking system of claim 1, wherein the controller locks the electronic device after the receiver receives the locking signal and unlocks the electronic device after the receiver receives an unlocking signal.

4. The locking system of claim 3, wherein the transmitter further comprises:
   a locking signal generator that generates the locking signal after being activated by an external signal; and
   an unlocking signal generator that generates the unlocking signal after being activated by another external signal.

5. The locking system of claim 1, wherein the controller further comprises:
   a disabling module coupled to circuitry of the electronic device to disable the electronic device;
   a control module coupled to the receiver and the disabling module to control the disabling module to disable the electronic device when the receiver has stopped receiving the locking signal for the predetermined time period.

6. The locking system of claim 5, further comprising:

an alarm signal transmitter in the electronic device and coupled to the control module, wherein the control module also causes the alarm signal transmitter to send an alarm signal when the receiver has stopped receiving the locking signal for the predetermined time period.

7. The locking system of claim 5, further comprising:

a locking confirmation signal transmitter in the electronic device and coupled to the control module, wherein the control module causes the locking confirmation signal transmitter to send a locking confirmation signal to the locking signal transmitter when the receiver receives the locking signal, wherein the locking signal transmitter generates an alarm signal whenever it does not receive the locking confirmation signal for the predetermined time period.

8. The locking system of claim 7, wherein the locking signal transmitter further comprises:

a locking confirmation signal receiver that receives the locking confirmation signal;

a locking signal generator that generates the locking signal; and an alarm signal generator that generates the alarm signal when the locking confirmation signal receiver does not receive the locking confirmation signal, wherein the alarm signal is transmitted by the locking signal transmitter.

9. The locking system of claim 1, wherein the locking signal transmitter is a wireless signal transmitter with a predetermined transmission range.

10. The locking system of claim 1, wherein the locking signal transmitter is one of a Infrared signal transmitter, a laser signal transmitter, a short-range radio frequency signal transmitter, and a microwave frequency signal transmitter.

11. The locking system of claim 1, wherein the locking signal has a predetermined transmission range within which the locking signal can be received.

12. The locking system of claim 11, wherein the predetermined transmission range for the locking signal transmitter can range from approximately two feet to six feet.

13. The locking system of claim 1, wherein the predetermined time period can range from approximately ten to sixty seconds.

14. A locking system for securing a mobile electronic device, comprising:

a locking signal transmitter fastened to a movable object away from the electronic device to transmit a locking signal;

a receiver in the electronic device to receive the locking signal; and a controller coupled to the receiver to lock the electronic device when the receiver keeps receiving the locking signal, and to disable the electronic device from being accessed after the receiver has stopped receiving the locking signal for a predetermined time period.

15. The locking system of claim 14, wherein the controller is activated by an activation signal, and deactivated when receiving a deactivation signal.

16. The locking system of claim 14, wherein the controller locks the electronic device after the receiver receives the locking signal and unlocks the electronic device after the receiver receives an unlocking signal.

17. The locking system of claim 3, wherein the transmitter further comprises:

a locking signal generator that generates the locking signal after being activated by an external signal; and an unlocking signal generator that generates the unlocking signal after being activated by another external signal.

18. The locking system of claim 14, wherein the controller further comprises:

a disabling module coupled to circuitry of the electronic device to disable the electronic device;

a control module coupled to the receiver and the disabling module to control the disabling module to disable the electronic device when the receiver has stopped receiving the locking signal for the predetermined time period.

19. The locking system of claim 18, further comprising:

an alarm signal transmitter in the electronic device and coupled to the control module, wherein the control module also causes the alarm signal transmitter to send an alarm signal when the receiver has stopped receiving the locking signal for the predetermined time period.

20. The locking system of claim 18, further comprising:

a locking confirmation signal transmitter in the electronic device and coupled to the control module, wherein the control module causes the locking confirmation signal transmitter to send a locking confirmation signal to the locking signal transmitter when the receiver receives the locking signal, wherein the locking signal transmitter generates an alarm signal whenever it does not receive the locking confirmation signal for the predetermined time period.

21. The locking system of claim 20, wherein the locking signal transmitter further comprises:

a locking confirmation signal receiver that receives the locking confirmation signal;

a locking signal generator that generates the locking signal; and an alarm signal generator that generates the alarm signal when the locking confirmation signal receiver does not receive the locking confirmation signal, wherein the alarm signal is transmitted by the locking signal transmitter.

22. The locking system of claim 14, wherein the locking signal transmitter is a wireless signal transmitter with a predetermined transmission range.

23. The locking system of claim 14, wherein the locking signal transmitter is one of a Infrared signal transmitter, a laser signal transmitter, a short-range radio frequency signal transmitter, and a microwave frequency signal transmitter.

24. The locking system of claim 14, wherein the locking signal has a predetermined transmission range within which the locking signal can be received.

25. The locking system of claim 24, wherein the predetermined transmission range for the locking signal transmitter can range from approximately two feet to six feet.

26. The locking system of claim 14, wherein the predetermined time period can range from approximately ten to sixty seconds.

* * * * *